March 14, 1933.    S. L. KERR    1,901,831
GOVERNOR
Filed Aug. 22, 1928    8 Sheets-Sheet 1

INVENTOR
S. LOGAN KERR
ATTORNEY

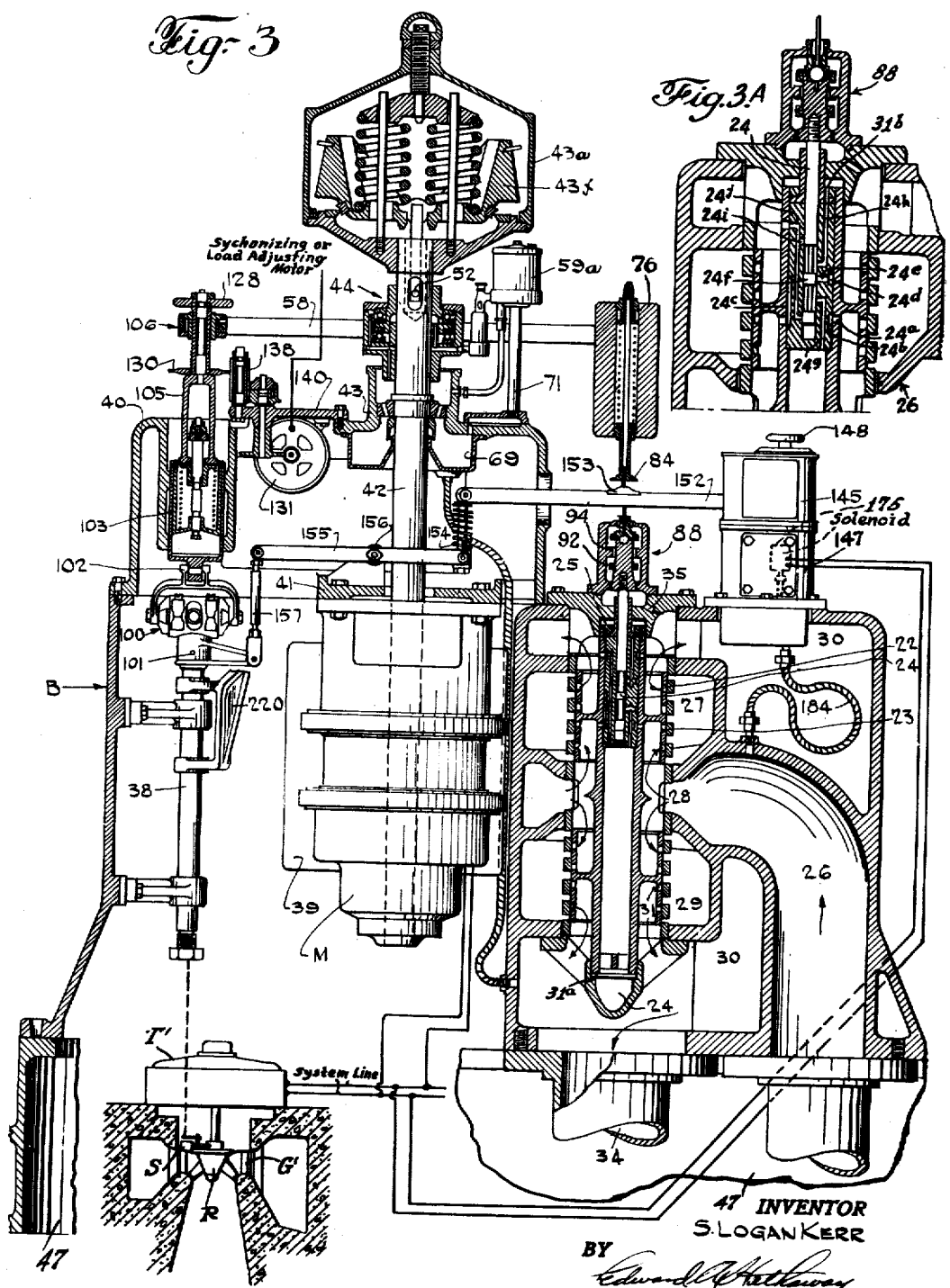

March 14, 1933.  S. L KERR  1,901,831
GOVERNOR
Filed Aug. 22, 1928   8 Sheets-Sheet 3
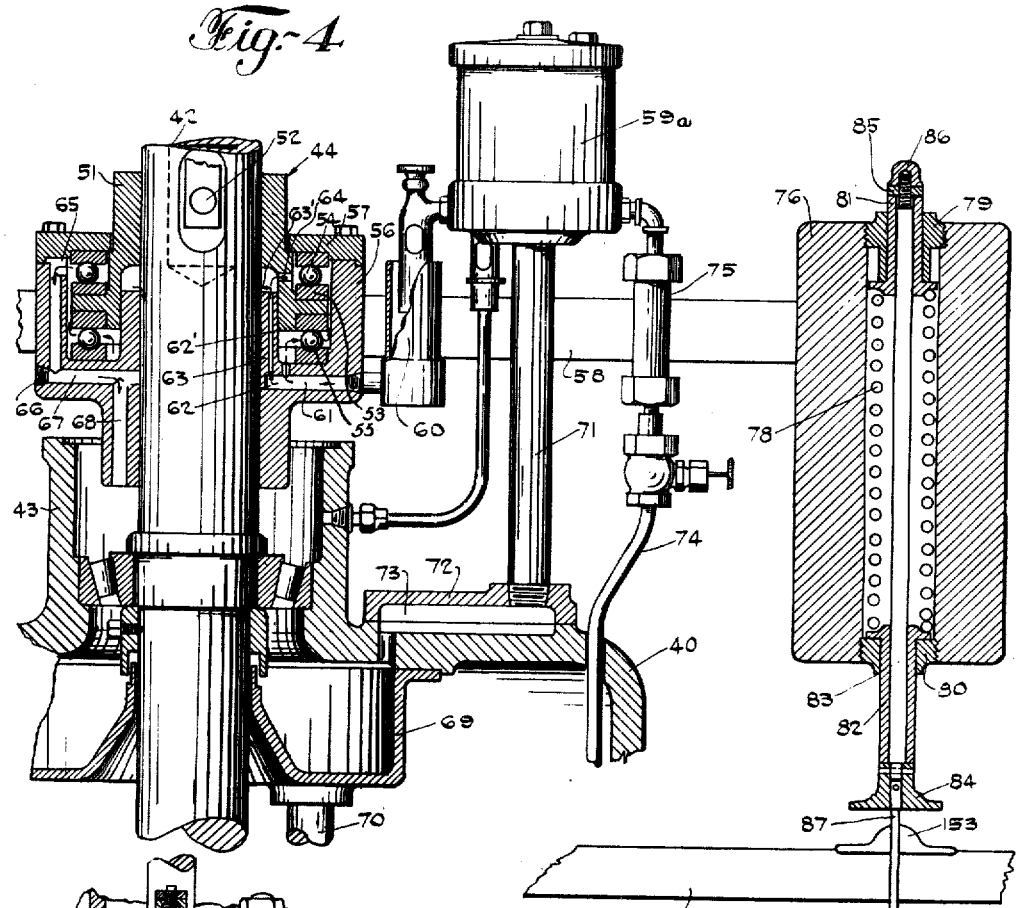
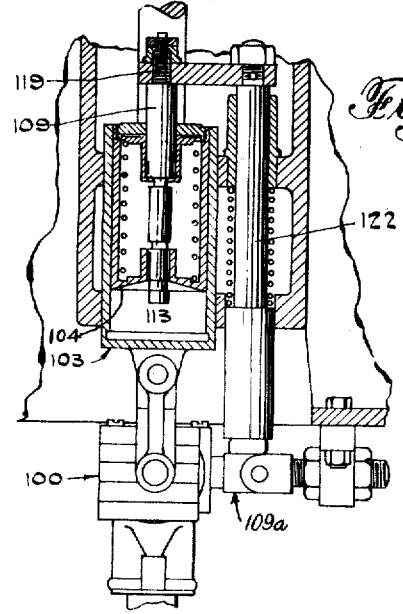
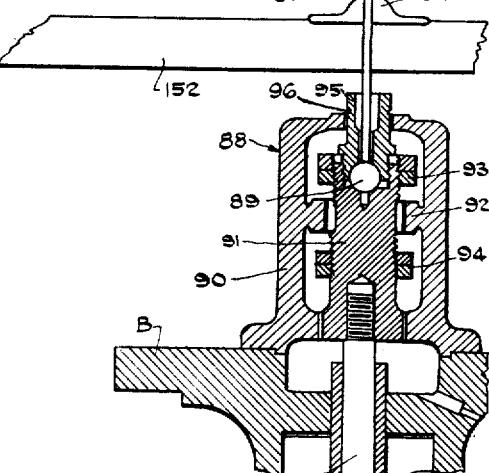
INVENTOR
S. LOGAN KERR
BY
ATTORNEY March 14, 1933.  S. L. KERR  1,901,831
GOVERNOR
Filed Aug. 22, 1928  8 Sheets-Sheet 4
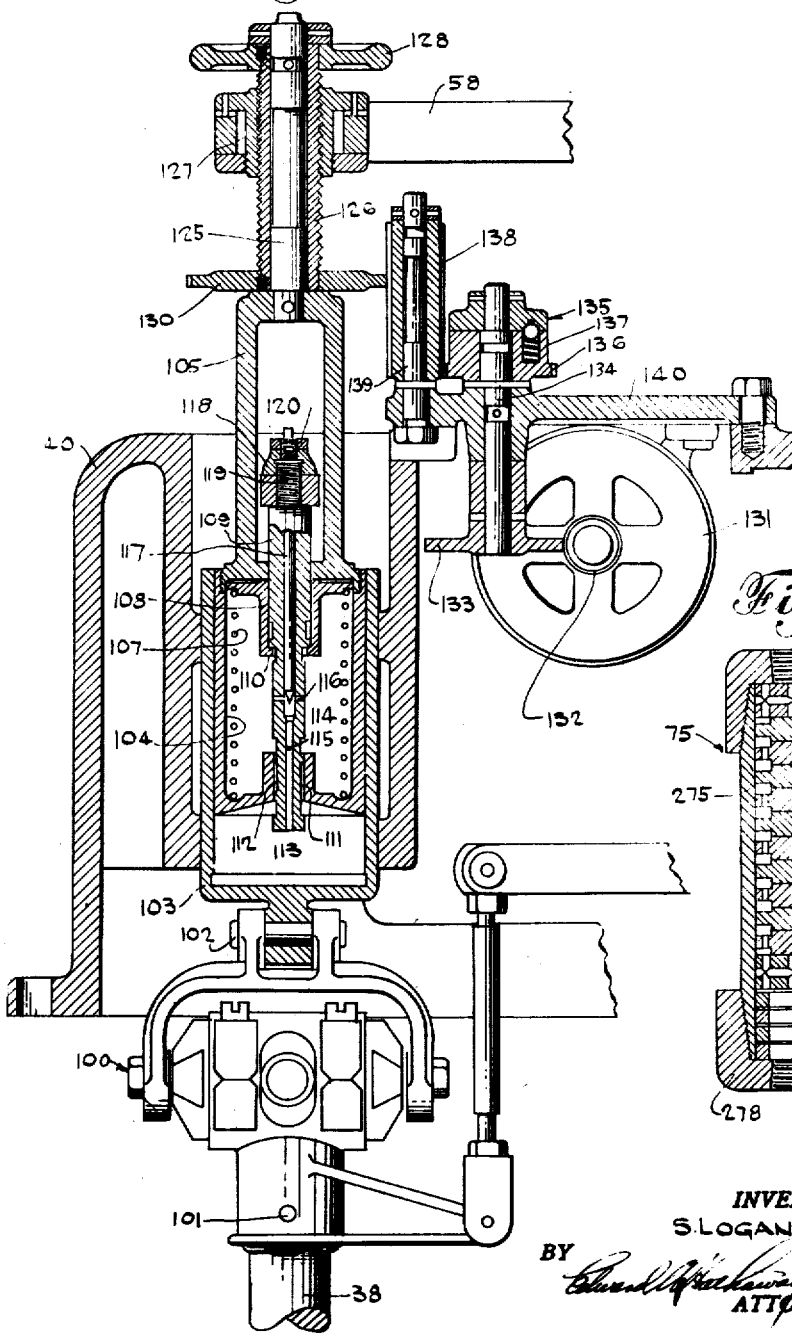
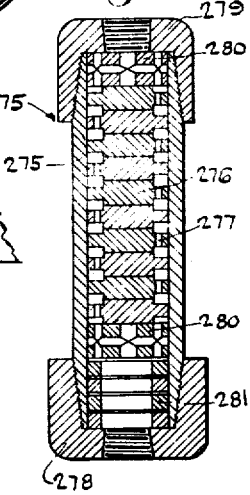
INVENTOR
S. LOGAN KERR
BY
ATTORNEY March 14, 1933.  S. L. KERR  1,901,831
GOVERNOR
Filed Aug. 22, 1928   8 Sheets-Sheet 5
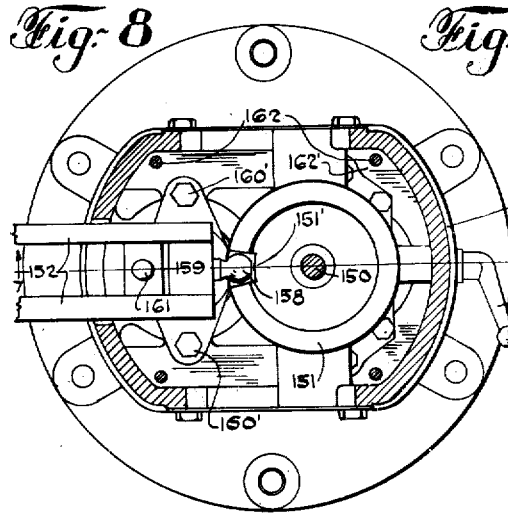
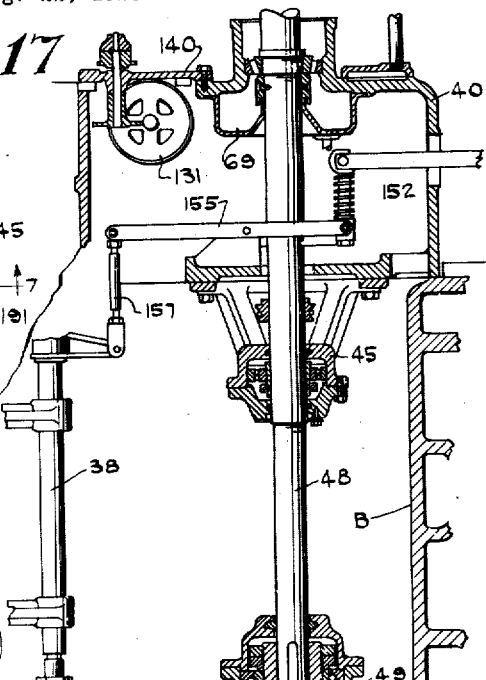
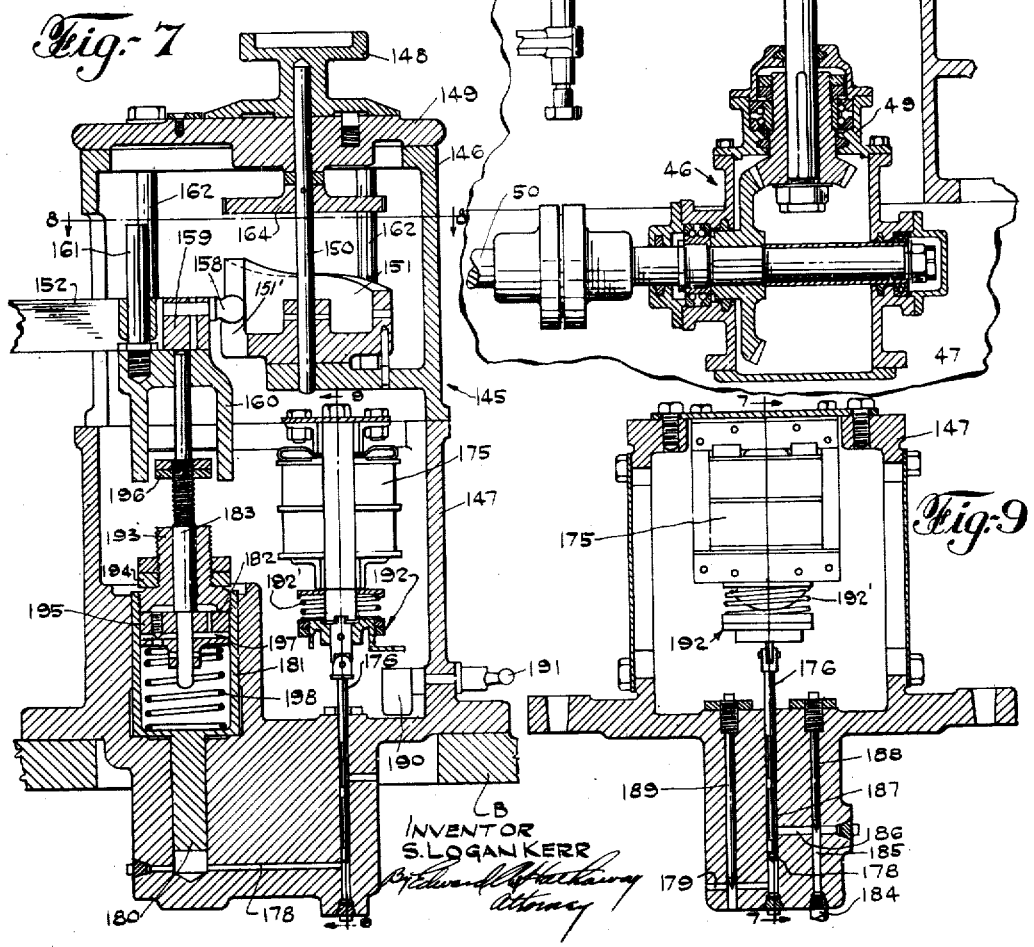
INVENTOR
S. LOGAN KERR

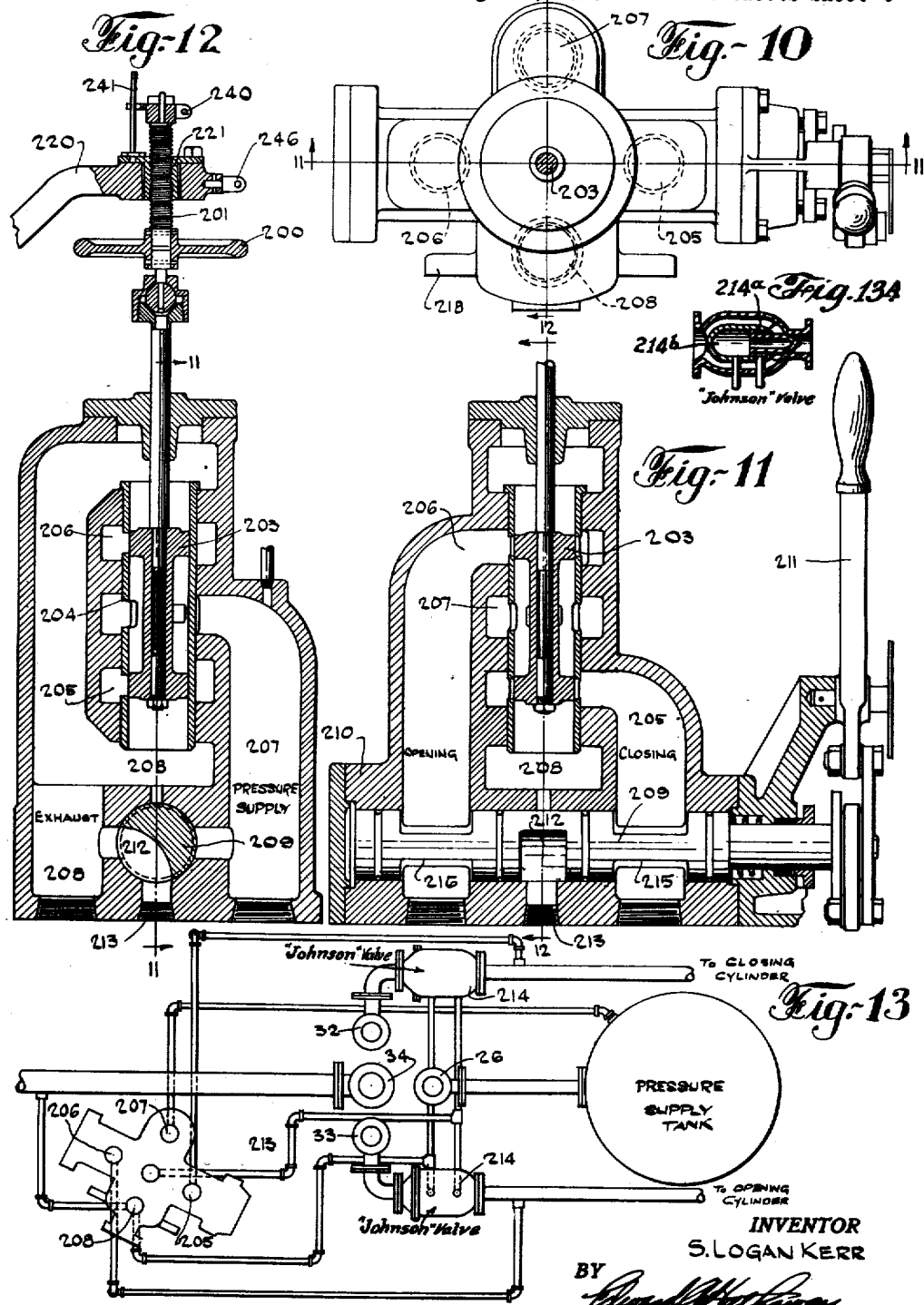

March 14, 1933.　　　　S. L. KERR　　　　1,901,831
GOVERNOR
Filed Aug. 22, 1928　　　　8 Sheets-Sheet 7

"Selsyn Transmitter" for Connection to Suitable Indicating device

Load Limit Adjusting Motor.

INVENTOR
S. LOGAN KERR
BY
ATTORNEY

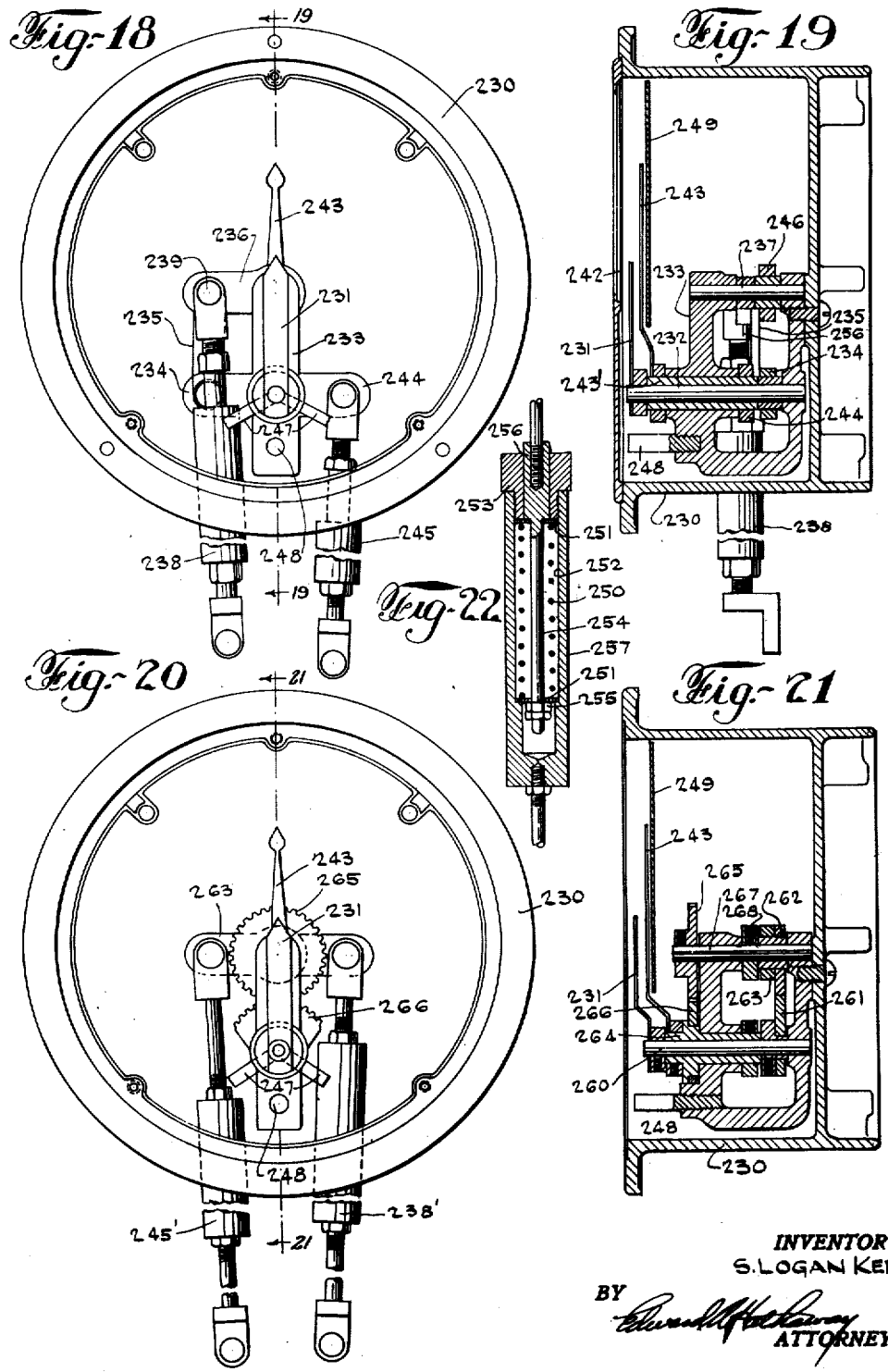

Patented Mar. 14, 1933

1,901,831

UNITED STATES PATENT OFFICE

SAMUEL LOGAN KERR, OF PHILADELPHIA, PENNSYLVANIA, ASSIGNOR TO I. P. MORRIS & DE LA VERGNE, INCORPORATED, A CORPORATION OF DELAWARE

GOVERNOR

Application filed August 22, 1928. Serial No. 301,374.

This invention relates generally to a governor which is adapted particularly for controlling the rotative speed of a hydraulic turbine and for effecting certain auxiliary controlling functions.

In the development of hydraulic power, the hydraulic turbines employed have generally come down to a few types in which the elements have a well defined and standard relation to each other whereas, on the other hand, the governing equipment for these hydraulic turbines has been constantly changing as to the arrangement of the elements although each of the various governor arrangements has retained more or less certain of the fundamental governing elements, such as the speed responsive device usually in the form of a centrifugal head, a floating lever, a pilot valve controlled distributing valve, and a restoring mechanism.

However even these elements in addition to many other auxiliary controlling mechanisms have found a great variety of arrangements dictated by individual ideas as to how a governor should be made in order to obtain: efficient speed control, simplicity of design as to compactness, appearance, and accessibility of parts and operation thereof, the accomplishment of an economical construction as to first cost, maintenance and operation, the ability to control the turbine speed under abnormal conditions such as when the load suddenly drops off or is entirely dropped, the efficient adjustment, by hand and otherwise, of various features of the governor without interrupting or interfering with the operation thereof, a suitable lubrication system for its various parts, a restoring mechanism which is efficient and positive in its action, a load limit arrangement and a timing mechanism for the gate stroke, there being in addition many other problems which will appear hereinafter.

It is one object of my invention to provide an improved cooperating arrangement of the governor elements, whereby the above features either alone or in combination will be obtained in a most efficient and economical manner. Another object is to provide an improved cooperating arrangement of parts whereby a number of elements may be wholly or partially enclosed within either a lower base or an upper housing, a further object in this respect being to associate certain of the governor elements with the upper housing to form a unit which may be assembled or removed from the base, as a unit. A further object in the motor operated type of governor, is to provide an improved construction in which vibration or any tendency to vibrate is eliminated or reduced to a minimum, such tendencies being caused by mechanical imperfections which might creep in during the manufacture of the governor and thus be beyond the control of the designer.

A further object is to provide an improved load limit mechanism and an improved arrangement thereof with the remaining governor elements, a further object being to provide improved motor actuating and position indicating arrangements for the load limit device.

Another object is to provide an improved automatic shut-down which may be used in the motor actuated type of governor in case of failure of the main generator current which is used to drive the motor, a further object with respect to this shut-down device being to reproduce the governing action of the centrifugal head and associated elements when the centrifugal control is rendered inoperative by failure of the main generator current. This latter phase is accomplished upon failure of the main generator current by shutting the gates down preferably entirely, or to a point below their speed no load position, after which the gates are re-opened to their speed no load position.

A further object is to provide an improved manual and motor operated speed synchronizing mechanism which is also adapted to be used for varying the load on the turbine.

A further object is to provide an improved bearing arrangement for connecting the floating collar and lever, another object being to provide an improved lubrication system including said bearing.

Still another object is to provide an improved double acting spring mechanism adapted to be interposed between the floating lever and the pilot valve of the main distributing valve.

A further object is to provide a surge chamber between the main distributing valve and the exhaust pipe leading therefrom, a more specific object in this respect being to so arrange the fluid passages and distributing valve mechanism within the governor base so that a part of the base itself may form the surge chamber.

Another object is to provide not only an improved panel arrangement for certain recording instruments, but also to provide an improved combined gate and emergency valve neutral position indicating mechanism. A further object is to provide an improved emergency and throw-over valve mechanism and to employ a novel principle of construction whereby governors of different capacities may be standardized to one size except the base which will be enlarged or reduced in accordance with its power capacity somewhat on the principle of a fan.

Further objects and advantages will be seen and described in connection with the description of the following drawings in which Fig. 1 is a perspective of the governor with certain attachments omitted from the load limit mechanism.

Fig. 3 is a vertical sectional view, certain parts being shown in elevation.

Fig. 4 is a fragmentary vertical section of the floating collar and gate stroke timing mechanism with the double acting spring mechanism interposed therebetween.

Fig. 5 is a fragmentary vertical section of the restoring and speed synchronizing mechanisms taken substantially on the line 5—5 of Fig. 2.

Fig. 6 is transverse vertical section of the restoring and speed synchronizing mechanisms taken substantially on line 6—6 of Fig. 2.

Fig. 7 is a vertical sectional view of the load limit and automatic shut-down taken substantially on lines 7—7 of Figs. 2 and 9.

Fig. 8 is a section taken substantially on line 8—8 of Fig. 7, the motor actuating and position transmitting mechanisms being omitted for clearness.

Fig. 9 is a vertical section of the automatic shut-down taken substantially on the line 9—9 of Fig. 7, the load limit device being omitted and parts being shown in elevation for clearness.

Fig. 10 is a plan view of the emergency control and throw-over valve mechanism.

Fig. 11 is a vertical section taken substantially on lines 11—11 of Figs. 10 and 12, the throw-over valve being shown in elevation.

Fig. 12 is a vertical transerse section taken on lines 12—12 of Figs. 10 and 11.

Fig. 13 is a piping diagram in which the emergency and throw-over valve mechanism is used for controlling the gate operating cylinders.

Fig. 16 is a vertical sectional view of the pressure reducing mechanism used in the lubricating system.

Fig. 17 is a fragmentary vertical section of the governor base and upper housing showing a mechanical type of drive for the centrifugal head.

Figs. 18 and 19 are respectively front and sectional elevations of the gate position and neutral valve position indicating mechanism, Fig. 19 being taken on line 19—19 of Fig. 18.

Figs. 20 and 21 are similar views of the indicating mechanism adapted for use on the opposite side of the governor to that for which the Fig. 18 form is adapted, Fig. 21 being taken on line 21—21 of Fig. 20.

Fig. 22 is a sectional view of a yieldable connection for the indicating mechanism.

The specific embodiment of the invention comprises generally a relatively large base of a form especially suited for containing in one end a main distributing valve, inlet and exhaust passages therefor, and surge chamber, while the other end includes a part of the restoring mechanism, emergency control and throw-over valve mechanism, and motor or mechanical driving means for the centrifugal head, the motor being supported by an upper housing which is relatively small in comparison to the base, this upper housing also containing the synchronizing and restoring mechanisms while the centrifugal head and floating collar and lever are disposed above but supported by the upper housing.

The load limit and automatic shut-down are also disposed on top of the base with the connections between the floating lever and pilot valve interposed between the upper housing and the load limit mechanism.

It is thus seen that the governor herein disclosed is of the actuator type in which the centrifugal head operates at a speed corresponding to that of a turbine and through the floating collar and lever controls the pilot valve in the main distributing valve of the governor, which in turn regulates the pressure at the two ends of the gate operating cylinder or servo motors S, Fig. 3, of the turbine. The apparatus is so arranged that when the speed of the turbine departs from normal, pressure is admitted to the proper end of the operating cylinders and exhausted from the other end, causing the turbine gates to open or close as may be required to bring the speed back to normal. In addition to this operation, regulating, adjusting and indicating devices are arranged to co-operate with the governor to supplement or supersede certain of the governor operations as may be desired.

The various elements will now be specifically described.

*Base.*—The power capacities of hydraulic governors vary in accordance with the size of the turbine R, Fig. 3 to be controlled and with the speed at which it is desired to operate the gates G' upon any variation in the turbine speed. It is desired in my present governor to so arrange the parts that as many standard parts may be used as possible for governors of various power capacities and still permit the size of the governor to be conveniently and economically varied in accordance with the power capacity desired. The result of this arrangement is a materially lessened cost of manufacture and other advantages.

Figure 1:
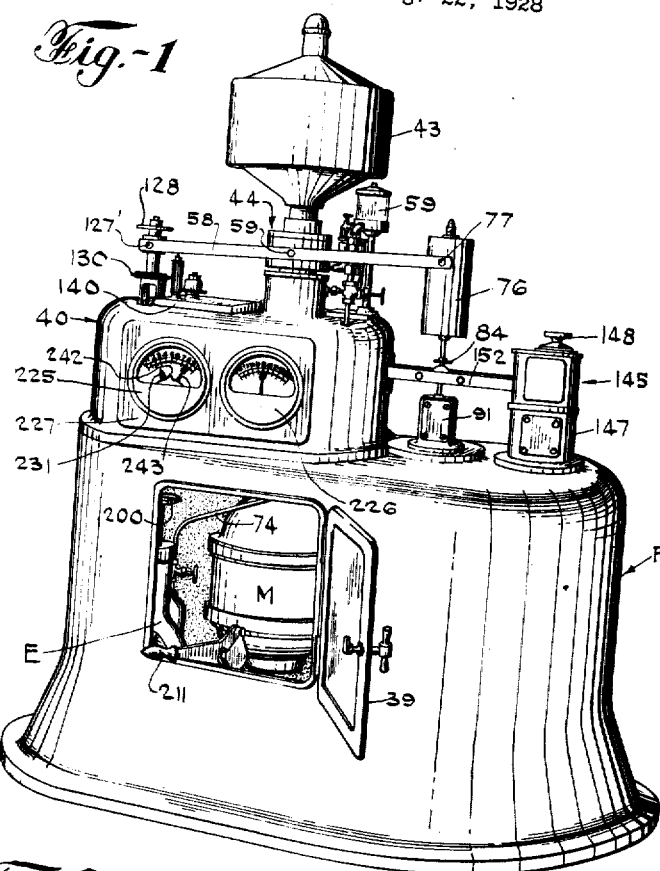
Figure 2:
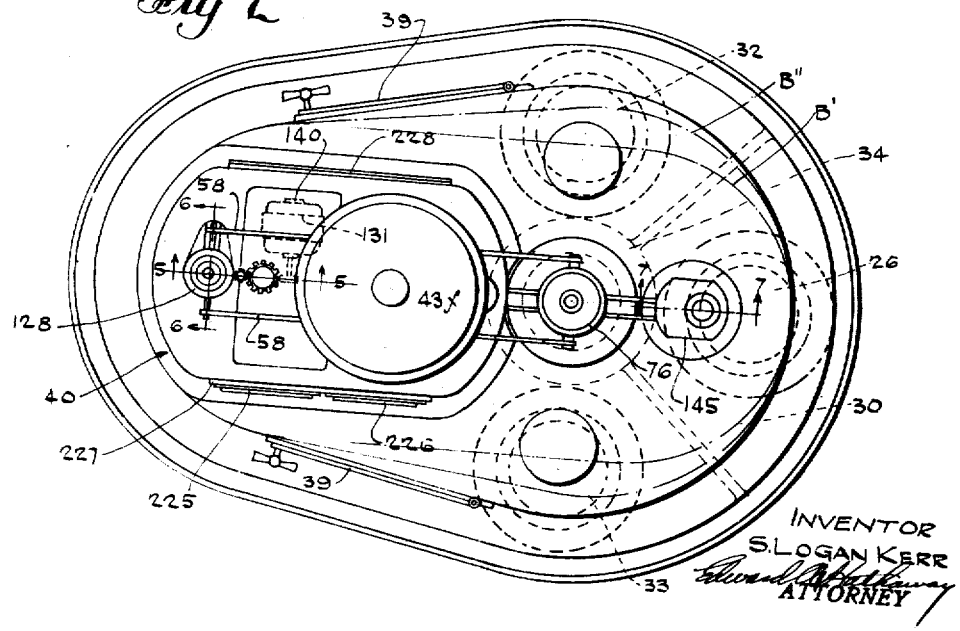
Fig. 2 is a plan view of the governor.

As the size and capacity of the governor are usually determined by the size of the main valve and the inlet and exhaust passages therefor, these elements, Figs. 1 and 2, are disposed within the large end of a fan shape base B so that if a governor of smaller capacity is built than that shown in the specific disclosure then the reduced size of the main distributing valve and its associated passages will permit the sides of the base to be closer together. If the capacity is greater, then the sides will be farther apart due to the increased size of the main valve and passages, but in any case the center line of the main valve remains fixed with respect to other elements such for example as the axis of the centrifugal head, thereby permitting use of the other standard devices for different sizes of governors. Thus the principle of construction for this variable base element in an otherwise standardized governor is that of a wedge shaped fan with its sides moved in opening and closing directions depending upon the size of the governor, the smaller end of the base, like the pivot end of a fan, remaining substantially constant for any variations in size of the large end. A governor of minimum power capacity would preferably have both ends of the base the same size as shown by the dotted outline B', while a governor of larger power capacity may have an intermediate position shown by the broken line B''.

The main distributing valve 22, Fig. 3, operates inside of a liner 23, having ports corresponding to those of the valve. The movement of the distributing valve is controlled by any desired type of pilot valve mechanism diagrammatically shown at 24, the pilot valve as is usual being operated by a centrifugal head. Distributing and pilot valves are well known mechanisms in the art shown for instance in Taylor Patent 1,501,447 and Rogers Patent 1,559,782 and do not per se constitute a part of my invention, so that a brief description thereof will suffice.

When the pilot valve 24, as shown in Figs. 3 and 3a, moves upwardly from its neutral position, fluid pressure is admitted from passage 26 through a series of radial ports 24a to an annular groove 24b which communicates with a longitudinal groove 24c and another annular groove 24d, from which fluid passes through radial ports 24e and thence downwardly past the valve spool 24f (which is now assumed to be in raised position) to the longitudinal passage 24g to thus allow fluid pressure to be admitted at the lower end 31a of the main distributing valve. At the same time fluid pressure is discharged from the upper end 31b of the main distributing valve, as through passage 24h, port 24i, and passage 24j. This causes the main valve to move upwardly and to permit flow of actuating fluid from the supply passage 26 into closing chamber 27 as by ports 28, while at the same time, allowing exhaust of fluid from an opening chamber 29 into a surge chamber 30 through ports 31. Closing and opening chambers 27 and 29 communicate respectively with the proper ends of the gate operating cylinders, Figs. 2 and 13, by passages 32 and 33. When the pilot valve, Fig. 3, moves downwardly from its mid-position, the opening and closing chambers are connected respectively with the supply passage 26 and surge chamber 30 by ports corresponding to ports 28 and 31, but in the opposite end of the main valve.

The surge chamber 30, by being of relatively large capacity, permits fluid to exhaust rapidly through the main valve to the surge chamber from which it finally discharges into the exhaust pipe 34, Figs. 2 and 3. The advantage of rapid exhaust is that the rate of gate movement is a function of the rate at which the liquid is discharged from the operating cylinders. A small drainage port 35, Fig. 3, will also serve as an air vent port which will insure that the surge chamber may at all times function properly.

Disposed in the other and smaller end of the base, Fig. 1, is an electric motor M, the emergency and throw-over valve mechanism E and the restoring or operating rod 38, Figs. 3 and 5, of the restoring mechanism, while doors 39 are disposed in each side of the small end of the base to permit access to these elements and also to perform a further function.

The upper rectangular shaped housing 40, Fig. 3, bolted to the top rear portion of the base, has a suitable bracket 41 to which is bolted the electric motor M, which may be of any suitable type such as an induction or synchronous motor, the rotor shaft 42 of the motor extending upwardly through a suitable tapered roller bearing 43 supported in a cup on the top of the upper housing 40. The upper end of the shaft carries a usual type of centrifugal head 43a containing flyballs or weights 43f and this head is adapted in a well known manner upon speed variations to cause a floating collar 44 to move vertically relative to the shaft 42 and, through a floating lever and other mechanism, to cause actuation of the main valve 22.

This head and motor construction is thus supported entirely by the upper housing, and has the advantage of not only being removable therewith, but also of being able to align the motor bearings and the tapered bearing 43 as a fixed unit. Also by disposing the head on one side of bearing 43 and the motor M on the other side, a very stable arrangement is presented in that any tendency for unbalance in the two rotating elements will be reduced to a minimum, if not entirely eliminated, there being a further advantage that the motor is entirely enclosed within the base and is readily accessible through the doors 39.

While an electric motor has been shown, which is operated in synchronism with the main turbine generator T', Fig. 3 and thereby cause a rotative speed of the centrifugal head corresponding to the turbine speed, yet other types of drives may be used such as belt or mechanical drives, but in either case, to change from one type of drive to another, it is only necessary to provide a longer shaft 42, and in each case, one of which is shown in Fig. 17, the shaft will be supported by a suitable bearing 45 formed as a unit with the upper housing 40. The gear drive, generally indicated 46, will be supported either by the base B or the supporting ring 47. To permit removal of the mechanically driven shaft 48 as a unit with the housing 40, it is only necessary to remove the bolts holding the lower gear cover 49 insofar as the driving mechanism is concerned. The gear drive is driven as usual by a positive mechanical connection in the form of a shaft 50 connected either directly by gear or otherwise to the turbine shaft.

*Floating collar and lever.*—The floating collar 44, Figs. 1, 3 and 4, has an improved passage arrangement whereby the bearing may be efficiently lubricated and comprises an inner sleeve 51 axially moved relative to the shaft 42 upon actuation by the centrifugal head to which it is pivotally connected in a usual manner as at 52. The sleeve has a radial flange 53 interposed between bearings 54 and 55 carried by a container 56 which has a removable cover plate 57 to permit assembling or dissembling of the collar. The floating lever 58, comprising two parallel rods disposed on each side of the container 56, is pivotally attached thereto as at 59, Fig. 1. To take advantage of centrifugal force for creating circulation of oil through the bearing, lubricant is fed from a stationary oil cup 59a through a telescopic-like joint 60, and then into a passage 61 and upwardly through passages 62 and 62' into annular chambers or spaces 63 and 63'. The lubricant then flows through a series of radial ports 64, and is circulated outwardly by centrifugal force as is also the case of the lubricant entering the chamber 63, thereafter discharging through ports 65 and passages 66, 67 and 68 into the stationary collar of the bearing 43 which in turn is lubricated and the oil finally discharged into an oil catcher 69 from which the lubricant is returned to the pressure system by pipe 70. The over-flow pipe 71 for the oil cup 59 is used as a supporting standard therefor and is removably mounted upon the upper housing 40, by a cover plate 72 adapted to form an over-flow passage 73 communicating with the oil catcher 69. Lubricant is supplied to the oil cup through pipe 74 leading from the emergency control to be described, while a pressure reducer 75 is interposed in the line.

*Double acting spring weight.*—Weight 76, Figs. 1, 3 and 4, pivotally connected as at 77, Fig. 1, to each of the rods forming the floating lever, performs the functions of counterbalancing a dashpot spring, to be described later, and to insure that there is no possibility of lost motion in the connections between the fly balls and the dashpot. This weight also acts as a container for a double acting spring 78 which transmits movement of the fly balls to the pilot valve 24.

The double acting spring effects said movement by the provision of plugs 79 and 80 threaded in the central bore containing the spring 78, which plugs slidably support flanged sleeves 81 and 82 in turn slidably supporting a rod 83. This rod at one end is rigidly conected to a contact disc 84, while the other end has a reduced threaded portion adapted to receive a nut 85 normally in engagement with the upper end of sleeve 81. Cap nut 86 locks the nut 85 in position and has sufficient clearance in its threaded recess to permit adjustment of the rod 83.

The adjustment of this double acting spring, which is interposed between the flanges of sleeves 81 and 82, is important in order to insure proper governing action, and by the particular arrangement of parts, it is possible by a single adjustment to effect proper contact between four sets of contact surfaces. The device is brought into proper adjustment by tightening nut 85 until the faces of the nut 85 and upper sleeve 81 are in contact with each other, while at the same time effecting contact between the lower sleeve 82 and disc 84. This will take out any lost motion between rod 83 and the two sleeves 81, 82. However, the lock nut is not tightened sufficiently to compress the spring to the extent of moving the face of sleeves 81 and 82 away from the inside faces of the plugs 79 and 80. It is thus seen that there are four sets of surfaces in contact with each other with no lost motion therebetween. The absence of lost motion in this device is necessary to avoid hunting in the governor, since any lost motion would not transmit the true movement of the fly balls through the floating collar 44, floating lever 58 and weight 78 down to the pilot valve 24.

*Gate stroke timing mechanism.*—The disc 84, Fig. 4, is rigidly connected to rod 87 as by removable pin 88, the rod extending down between two members of the load limit restoring lever 152, and being connected at its lower end to the gate stroke timing mechanism 88 by a ball and socket joint 89. The timing mechanism comprises an outer housing 90 provided with side openings adapted to have covers 90a, which may be sealed after the timing adjustment has been made. The rate at which the gates are operated depends upon the amount of main valve opening, and this in turn is controlled by the amount of movement of the pilot valve inasmuch as the main valve follows the movement of the pilot valve in the usual manner. Hence, by limiting the distance of movement of the pilot valve as has heretofore been done, the rate of gate opening may be controlled. To do this, the stem of the pilot valve 24 is connected to a central member 91 which extends through an opening in a partition 92 against which adjustable nuts 93 and 94 will abut so as to limit the pilot valve movement in either direction the degree of valve movement being in accordance with the adjustment of nuts 93 and 94. There also extends through the top of the housing 88 a sleeve 95 forming part of the ball and socket joint 89 and having a small annular groove 96 which, when flush with the top of the housing 88, indicates neutral position of the pilot valve. The closer together that the nuts 93 and 94 are, the smaller will be the degree of main valve opening and accordingly the slower the gate movement will be, while the farther apart the nuts are, the greater will be the rate of gate movement.

From the arrangement so far described, it is seen that when either of the nuts 93 or 94 engage the partition 92, and if for any reason the floating lever 58 should continue to have a moving force applied thereto in either direction, double acting spring 78 will permit movement of the floating lever without subjecting the pilot valve or stroke timing mechanism to possible injury, and in addition, as will be seen later in the description of the load limit mechanism, it is also possible to hold the disc 84 against movement and still permit movement of the floating lever 58 through the use of the double acting spring.

*Compensating mechanism* ccount of the inertia of the revolving parts of the unit and of the mass of water in the penstock, casing and draft tube, the speed of the water wheel does not respond instantly to movement of the gates. To prevent over-running and hunting of the governor on this account, compensating devices are provided for returning the pilot valve to mid-position by changing the height of the left end of the floating lever. The mechanism here employed is of a general well known type that will be described in order to understand a certain improvement therein. The gate operating or servo-motors, or the gates themselves are connected, Figs. 3 and 5, through suitable linkages to a restoring rod 38 so that it will be raised as the gates close and lowered when the gates open. Also, the governor fly balls swing outward with an increase of speed, thereby raising the right end of floating lever 58 which moves pilot valve 24 upwardly to close the turbine gates. Therefore as the gates close, rod 38 moves upwardly and transmits its movement through a dash pot 103 to move the left end of the floating lever up and the right end down thereby moving the pilot valve back to mid-position and arrest the gate movement notwithstanding that the speed is still above normal. Interposed between rod 38 and the dashpot mechanism is a permanent speed change device 100 pinned to rod 38 as at 101, while the upper side of the speed change device is pivotally connected as at 102 to the dashpot plunger 103 containing a chambered piston 104, Fig. 5, in turn connected to the floating lever 58 by a yoke 105 and a manually operated synchronizing device 106 which is so arranged that the floating lever has movements corresponding to that of the yoke 105.

A spring 107, interposed between the base of piston 104 and the flange of a sleeve 108, tends to hold a pilot valve 109 in an upward position through the flange connection 110. Flatted portions 111 and 112 formed on the lower end of pilot valve 109 are adapted in the usual manner to control flow of fluid between the chambers 113 and 114.

My improved feature in this dashpot resides in providing a constant by-pass between chambers 113 and 114 as by passages 115 and 116. There is also provided a small needle valve 117 adapted to control the degree of by-passing, and adjustment is effected by threading the upper end of needle valve 117 in a cap 118 mounted upon the upper threaded end 119 of pilot valve 109, the needle valve being locked in position by nut 120. A suitable square head is provided on the upper end of rod 117 whereby the adjustment may be effected and is reached through the open sides of the yoke 105.

In addition to giving the necessary degree of by-passing as may be required on any particular installation, the needle valve may be adjusted to take care of changes in the viscosity of the oil used in this dashpot, these viscosity changes usually being caused by seasonal temperature changes. The mechanism for actuating the pilot valve 109 consists, Fig. 6, of a link 109a having a stationary pivot at one end while its other end is connected to the permanent speed change device 100. One end of a rod 122 is suitably connected to an intermediate portion of link 109a while the other end is connected by a cross bar to the threaded portion 119 of pilot valve 109.

*Operation of speed control and restoring device.*—Operation of the mechanisms so far described are well understood in the art and hence will only be briefly given. Upon decrease of the turbine load, the turbine tends to speed up, thereby causing the contrifugal head mechanism to cause upward movement, Fig. 3, of the floating collar 44 and corresponding upward movement of the weight 76 and pilot valve 24, the floating lever tending to pivot around its left end. Upward movement of the pilot valve causes the main valve to move upwardly to permit flow of fluid from the inlet passage 26 into closing chamber 27 and to the closing cylinder of the gate operating mechanism; at the same time, fluid is exhausted from the opening cylinder of this mechanism and discharged through the surge chamber 30 and exhaust pipe 34. As the gates move, restoring rod 38 raises and causes upward movement of dashpot plunger 103, thereby compressing the oil in chamber 113 and moving piston 104 upwardly and accordingly move the left end of the floating lever upwardly. The pilot valve end of the lever, however, moves downwardly due to pivoting around the floating collar 44, and thus moves the main valve back to its neutral position, this main valve movement back to mid-position taking place even though the turbine speed is still above normal. As the piston 104 rises, pilot valve 109 moves upwardly also but to a smaller extent due to being actuated by the pivoted link 109a, Fig. 6, the result being however that piston 104 moves upwardly with respect to the pilot valve. Hence, upon this relative movement, Fig. 5, passage 112 allows communication betwen chambers 113 and 114 whereby oil is by-passed from the lower to the upper one, the spring 107 constantly tending to force the piston 104 downwardly. By-passing of oil will also take place through passages 115 and 116. The downward movement of piston 104 will have an initial rate governed by the combined area of passages 112 and 115, whereas when the passage 112 is covered, the remaining downward movement of piston 104 is governed by the degree of adjustment of needle valve 117, thereby causing a slower rate of movement near the lower end of the piston stroke. As the piston 104 moves back to its neutral position, the pilot valve 24 is moved upwardly due to the pivoting of the floating lever. Upward movement of the pilot valve thus again causes the main valve to admit fluid to the closing chamber 27 and effects still further closure of the turbine gates. Thereupon further gate movement again actuates the restoring mechanism so as to effect the same cycle of restoring operation as above described until finally the turbine is brought to its normal speed.

*Synchronizing and load adjusting mechanism.*—The permanent speed change device 100, Figs. 3 and 5, is well known in the art as to structure, operation and purpose, but its purpose will be briefly given here to understand one necessity of the speed synchronizing device which is also well known in the art but in which there are certain improvements herein disclosed. In order that two or more units of a system may operate satisfactorily in parallel, and properly divide the load at different gates, the governor at each unit must automatically reduce the speed slightly as the load builds up, and as the gates move from closed toward open position. The degree of permanent speed change varies with the requirements of the system, but in any event after the load change has taken place it is desired to correct this permanent or inherent speed change by hand or motor operation, to keep the frequency constant from no load to full load. This is done by the synchronizing mechanism which is also used for load adjustment from the switch-board so as to increase or decrease the load by raising or lowering the left end, Fig. 3 of the floating levers 58 or for speed adjustment when bringing the turbine up to a point of synchronism with the main line.

In order to change the speed, it is only necessary to change the relative positions between the left end of the floating lever 58 and restoring dashpot mechanism 103. To do this there is provided, Fig. 5, a spindle 125 immovably secured to the yoke 105 and carrying a threaded sleeve 126 having screw engagement with a nut 127 pivotally supported, Fig. 1, as at 127' between and by the ends of the two rods forming the floating lever 58. The upper end of the threaded sleeve carries a hand wheel 128, Fig. 5, while the lower end has a gear 130 fixed thereto. Thus, upon actuation of this sleeve 126 by the hand wheel floating lever and dashpot 103 are brought nearer together or moved apart and thereby vary the speed of the turbine accordingly.

If it is desired to rotate the threaded sleeve from a remote point such as from the switchboard, an electric motor 131 may be actuated to operate the gear 130 through a gear train comprising an armature worm 132, worm gear 133 meshing therewith, shaft 134, slip clutch 135, gear 136 formed on the lower clutch element 137 which is rotatable on shaft 134, and an axially extended gear 138 journalled upon a shaft 139 which is supported by a combined cover and supporting plate 140. The whole gear train and the motor 131 are supported by plate 140 so as to form a unit, which may be removed as a unit from the upper housing 40 and accordingly may be manufactured as a standard piece of mechanism for use with governors of different sizes or capacities. In addition motor 131 is permitted to be disposed within housing 40 due to the improved cooperating arrangement of parts and the provision of the upper housing. The gear 138 meshes with gear 130 irrespective of its vertical position, and even though nut 127 has been raised or lowered to the full limit of its travel still no danger can come even if the motor 131 is continued to be operated as the clutch 135 will slip so as to prevent damage to any part of the gear train or the motor itself.

*Load limit device.*—The degree of opening of the turbine gates and consequently the load to be carried by the turbine may be controlled by the load limit device 145, Figs. 1, 3, 7, 8 and 9. This device Fig. 7 comprises a housing 146, mounted upon an automatic shutdown device 147 which will be described later. The load limit device includes a hand wheel 148 having, in combination with the cover 149, suitable graduations for indicating various gate positions any one of which may be chosen as the limit of the turbine load. The hand wheel, mounted upon shaft 150, carries a cam 151 for raising and lowering a load limit lever 152, which comprises two spaced rods between which the pilot valve actuating rod 87 extends, Fig. 4. Suitable raised members 153, Figs. 3 and 4, engage a disc 84 on opposite sides of rod 87. The inner end of lever 152 is connected, Fig. 3, through an equalizing spring and bolt arrangement 154, to a lever 155 having a stationary pivot 156, the equalizing spring arrangement being such that the inner ends of levers 152 and 155 may, from the position shown move toward each other but not apart. The opposite end of lever 155 is pivotally connected to the restoring rod 38 by a link 157. More specifically, lever 152 has engagement, Fig. 7, with cam 151 at substantially right angles to the axis thereof by a rounded pin 158 which is supported in a lift block 159 to which both rods of the lever 152 are rigidly secured. The cam also has an opening 151' between its highest and lowest points so as to permit pin 158 to pass through slot 151' when the load limit housing and cam arrangement is bodily removed. The low point of the cam is on a level with the lower side of the pin 158 in the position as shown, Fig. 7. Normally, lever 152 rests upon a guide bracket 160 which carries a guide pin 161 for lever 152. Cover 149 and housing 146 are held on housing 147 by long bolts 162 threaded in flanges 162' formed in housing 147, the guide bracket 160 also being supported on these brackets by bolts 160'.

In operation of the load limit device, if it is desired to positively limit the turbine load, hand wheel 148 is turned clockwise to raise lever 152 a predetermined amount which, in turn, Fig. 3, will raise disc 84 by members 153. Thus the pilot valve will be raised a predetermined amount, and the main valve will assume a position for admitting pressure to the closing operating gate cylinder. However, gate movement in a closing direction will cause restoring rod 38 to move upwardly, and accordingly cause the left end of lever 152, Fig. 3, to move downwardly and accordingly bring the pilot valve back to a position for arresting closing movement. However, the restoring action is only temporary and the gates ultimately come to a position corresponding to that indicated by the load limit handle 148.

In the drawings, the fly balls 43f are in their normal speed position with the turbine gates at 50% opening, and the load limit in this case is set so as to have a 100% gate opening, so that the pilot valve 24 is under the full control of the centrifugal head. If, however, the centrifugal head stopped rotating, the lowering of lever 152 and weight 76 would cause the disc 84 to come in contact with members 153 and the turbine gates would assume a new position. This new position, however, may be definitely limited by setting the load limit handle, as before described.

If desired, the load limit device can be used for starting and stopping the turbine without the centrifugal head running. If the load limit is set at zero gate, which would mean that lever 152 would be raised to its maximum vertical height by cam 151 and that the turbine gates would be in full closed position with the gate timing adjusting nut 94 raised nearer to the partition 92, then by controlling the gate operating cylinders through the emergency control E, Fig. 1, the gates may be opened, it being noted that when the gates open, the restoring rod moves downwardly so as to cause or tend to cause upward movement of lever 152 until adjusting nut 94 engages partition 92. However, no damage can be done to any of the mechanism, for any further tendency to raise lever 152 would be taken up by the equalizing spring 154.

Figure 15:
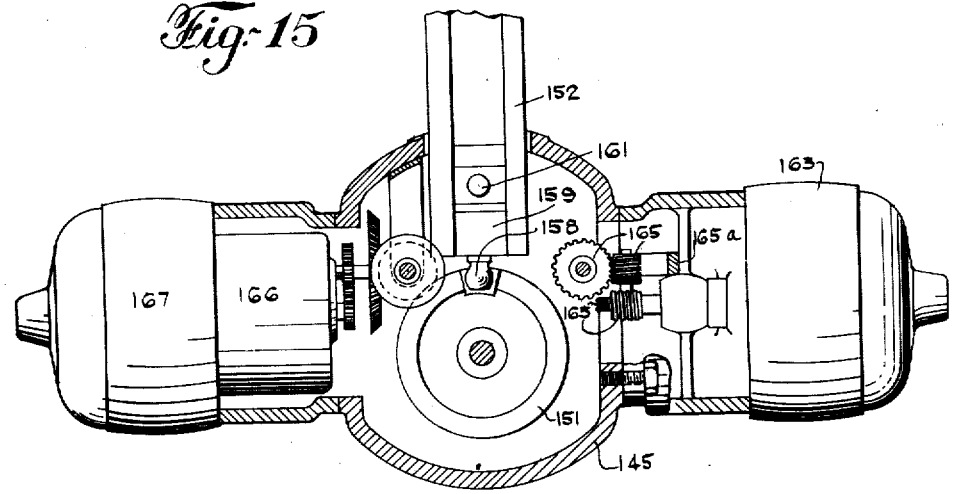
Fig. 15 is a plan view partially in section taken substantially on line 15—15 of Fig. 14, with parts omitted.
Figure 14:
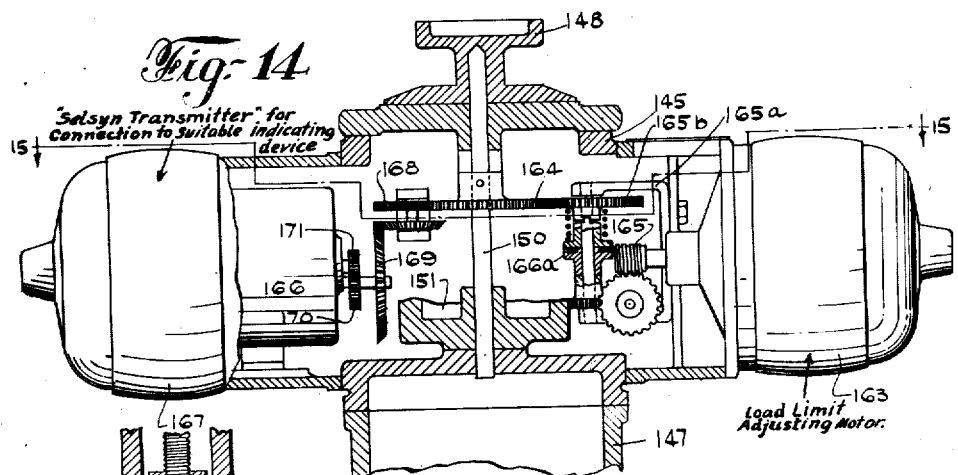
Fig. 14 is a partial vertical section of the load limit device with the actuating motor and position transmitting device attached thereto.

*Motor operation of load limit.*—To operate the load limit device from a remote point, an electric motor 163, Figs. 14 and 15, is mounted on the housing 145 and has its shaft and gearing extend through an opening therein. The cam shaft 150 carries a gear 164 which is actuated by the motor through a gear train comprising two sets of cooperating worm and worm gears 165 respectively supported upon suitable shafts supported in a bracket 165a while finally a spur gear 165b meshes with gear 164. To avoid damage in case motor 163 is overrun and also to permit actuation of handle 148, gear 165b has a driving connection with the worm gearing only through a spring held yieldable friction clutch 166a. The worm gearing would prevent rotation of handle 148 without the friction clutch. Thus, upon actuation of the motor 163, cam 151 will be rotated in either direction to effect the same operations as though handle 148 was operated.

To transmit to a remote point the position of the load limit cam, there is provided on the other side of housing 145 and preferably substantially in alignment with the motor 163 a Selsyn or equivalent type of electrical transmitter mechanism diagrammatically shown at 166 which is a standard instrument in the nature of an electric generator for driving a remotely located position indicating motor. The transmitter and indicator, or generator and motor, have a synchronous action whereby any partial or continuous angular displacement of the generator will cause an identical angular displacement of the motor which is the receiving end of the equipment. The transmitter is here mounted in a casing 167 supported by and adjacent to an opening in the housing 145. This transmitter is connected to the cam shaft 150 by a gear train comprising a spur gear 168 meshing with gear 164, bevel gears 169 one of which is mounted on the same shaft with gear 168 while the other is mounted upon a shaft carrying a spur gear 170 which meshes with a gear 171 mounted upon the usual transmitter operating shaft. The motor 163 and transmitter 167 have been omitted for the sake of clearness from all figures except Figs. 14 and 15. If in some particular installation it is not desired to use the motor and transmitter mechanism, the same may be omitted and the openings in housing 145 covered with plates such as are shown for covering similarly shaped openings in the automatic shut-down housing 147.

*Automatic control and shut-down.*—In connection with the motor driven fly ball type of governor a protective device, Figs. 3, 7, and 9, is contained within the housing 147 to take care of the loss of voltage on the main generator, which loss would cause a failure of the governor driving motor circuit. The automatic protective device consists preferably of a single phase shunt wound continuous duty alternating current solenoid 175 connected preferably across the circuit of the centrifugal head driving motor M. When the fly ball motor M is being driven the solenoid will be energized and a pilot valve 176 will be in the raised position shown to permit exhaust of fluid pressure through passages 178 and 179 from the under side of plunger 180. This permits lowering to the position shown in Fig. 7 of the plunger 180 and its hollow plunger 181 formed therewith. It also permits a piston 182 and spindle 183 to similarly assume a lowermost position, so that the lift plate 159 of lever 152 will rest upon the guide bracket 160, thereby allowing the pilot valve disc 84 to be lowered and hence the pilot valve 24 will be under the control of the governor fly balls.

When the solenoid 175 is de-energized, due to failure of the main generator current it will drop along with pilot valve 176 and admit pressure from the governor system as by a pipe 184, to the under side of a piston 180 as through passages 185, 186, annular groove 187 and passage 178, thus raising the piston 181, spindle 183, lift plate 159 and accordingly pivotally moving lever 152 about its left end, Fig. 3, whereupon bracket 153 engages collar 54 to raise pilot valve 24, Fig. 3, and thus cause the turbine gates to close and shut down the unit.

The solenoid is automatically reset as soon as the voltage is established on the driving motor circuit. The needle valve 188 is adjustable by a threaded connection at its upper end to vary the rate at which pressure may be supplied to move pistons 180 and 181 upwardly, while needle valve 189 controls the rate at which oil is exhausted from beneath plunger 181 and hence fixes the rate at which piston 181 will drop.

These two adjustments are provided to meet the local requirements and the power system characteristics. The more that needle valve 188 is throttled the slower will be the rate of upward movement of plunger 181. It may be desirable to have a certain time lag introduced between the dropping of the solenoid and the raising of plate 159 to delay the tendency of either partial or complete shut down of the unit in the event of a short circuit on the distribution lines from the generator. During a lightning storm the voltage on the generator may be reduced to a very low value for a period of 1 or 2 seconds or even longer. With such an occurrence the solenoid will drop, but due to the time lag introduced by the needle valve 188, the unit will not shut down instantaneously. With the re-establishment of voltage at its normal value, the solenoid will restore plate 159 to its normal position. If, however, the short circuit is longer than two or three seconds duration, some load may be dropped on the unit before voltage is re-established. On the other hand, if the overspeed and undervoltage relays usually employed on the generator trip out, the plunger 181 will continue its upward movement and shut down the unit. All this will be accomplished without any attention required from the operating staff. The solenoid 175, which is designed for energization by alternating current, is provided with a weight 192 or spring 192' or a combination of both to adjust the points at which the solenoid will pick up or drop the small pilot valve 176.

By varying the weight or adjusting the tension of the spring the voltage at which the solenoid will pick up or drop out can be changed; although by the use of an adjustable spring, an additional function can be secured. Due to the combination of pull characteristics of the solenoid and force characteristics of the spring, the device can be set to drop out at relatively high percentages of normal voltage and still be able to pick up the small pilot valve 176 when energized.

This improvement is of great value during certain short circuit conditions when not only is the generator voltage reduced, but load demand is also greatly reduced.

Under such conditions the solenoid will drop out with a small reduction of voltage and the shut down plunger 180 will start to cut off the input to the turbine, thus functioning in accordance with the variation in demand, before the excess of output over demand increases the speed of the unit sufficiently to operate the governor flyballs in the usual manner.

The adjustment of the spring tension can be set for the particular requirements of each installation, by the threaded engagement of the weight with the adjusting collars. The weight can also be varied as desired by increasing or decreasing the size of the component parts of 192, for instance, the locknut on spring holder.

When starting the unit with an electrically driven governor head, solenoid 175 will always be de-energized and plate 159 will be in its full up position either under the control of plunger 181 or of the load limit cam 151, which is operated by hand wheel 148.

In order to restart the unit is will be necessary to reset the solenoid to permit plunger 180 to lower and consequently lower the pilot valve 24. The operations required to start the unit are as follows: 1. Turn hand wheel 148 on the load limit to the closed position thus holding plate 159 in its extreme upward position. 2. Turn the cam 190 to its vertical position as by handle 191 to engage and hold weight 192 in an upward position which will likewise hold the solenoid and pilot valve 176 in their upward position. This will permit exhaust of fluid from beneath piston 180 and accordingly re-set the piston and spindle mechanism 181, 183 to the running position. The unit is then under the control of the load limit 145 only. 3. By turning hand wheel 148 to the left, plate 159 will be lowered which in turn will lower levers 152 and disc 84 connected to the pilot valve 24 and hence will admit pressure on the opening side of the operating cylinders and start the gates moving. As soon as the turbine starts, the load limit can be returned to zero or near zero until the unit comes up to a point slightly below normal speed. 4. With the unit operating at or near normal speed without load, the voltage can be built up on the generator, which will start the flyballs revolving and at the same time will energize solenoid 175 keeping it in the upward position. 5. As soon as voltage is established on the unit, and solenoid 175 raises to its upward position, the handle 191 and cam 190 will automatically drop to the running position (horizontal) thus releasing lift cam and leaving the solenoid 175 free to drop in case of loss of voltage.

The operation of the shut down of the unit with motor operated flyballs can be effected in several ways, but before proceeding with the description of the methods, certain of the following auxiliary features of this automatic control will be described.

*Reproduced governor action.*—To reproduce the action of the governor when the voltage fails on the main generator plunger 181, Fig. 7, is provided with a spindle cover 193 on which lock nuts 194 are adjustably threaded and adapted to engage the lower edges of a guide bracket 160 when the plunger 181 is moved upwardly. By adjusting these lock nuts, the stroke of plunger 181 may be limited thereby permitting plate 159 and lever 152 to be raised only a predetermined amount, which would correspond to any desired position preferably from zero to 50 per cent gate.

Inside of the dashpot is located an internal piston 195 which is connected to the spindle 183 on which other lock nuts 196 are located. The distance between the lower face of lock nuts 196 and the upper face of cover 193 is adjustable and limits the downward movement of the piston 195 and spindle 183. Spindle 183 extends on through guide bracket 160 and engages the lower face of the lift block 159.

When solenoid 175 is de-energized the lowering of pilot valve 176 admits pressure to raise simultaneously plunger 181, dashpot cover 193, piston 195 and spindle 183, lifting plate 159 to the top of its travel. As soon as the lever 152 comes in contact with the disc 84, Fig. 3, it raises pilot valve 24 until the lock nut 94 comes in contact with the stop 92. This closes the turbine gates completely.

A certain amount of pressure, Fig. 7, is exerted between the bottom of piston 195 and the oil contained in the dashpot plunger 181. As dashpot plunger 181 is at the upper limit of its travel and full pressure is maintained under plunger 181 holding it at this position, the oil in the dashpot by-passes slowly from the lower side of the piston 195 through an adjustable needle valved passage 197 therein to the upper side of the piston, thereby permitting the spindle 183 to lower, even against a spring 198, due to the weight 76 and any pressure existing through the double acting spring 78 or the equalizing spring 154, acting downwardly on piston 195 through lever 152 and spindle 183. The spindle 183 will therefore slowly drop depending upon the rate of by-passing of oil in the piston 195. This will gradually lower plate 159 until the pilot valve 24 is restored to the neutral position and is continued below neutral position at which time the gates will start opening again and will continue to open until after the lock nuts 196 come in contact with the upper face of the dashpot cover 193 and the pilot valve is returned to neutral position by the action of the gate restoring mechanism, Fig. 3, including rod 38 and linkages 155, 152 and disc 84. Contact of nuts 196 with cover 193 stops the motion of spindle 183, plate 159 and lever 152, and thereby limits the downward position of pilot valve 24 so that the adjusted position of nuts 196 determines the amount of gate opening on the unit, which preferably should correspond approximately to speed no load under normal operation. The distance between lock nuts 196 and the upper face of the dashpot cover 193 can be adjusted to give this speed no load position, and the more gate opening required at speed no load, the greater should be the distance between these lock nuts and cover 193.

It is thus seen that the turbine gates have gone through the following cycle of operation: First they have been closed completely, cutting off all the water from the turbine and permitting the turbine speed to return to normal rapidly and second, the gates are returned to and maintained at speed no load position due to the action of the dashpot piston 195 which release the gates to this speed no load position. This cycle of operation actually reproduces the governor action which occurs when full load is thrown off the unit but with the flyballs still in operation.

To restore service under such conditions it is necessary only to re-establish voltage on the main generator. This re-establishes current in the motor driving circuit and starts the flyballs revolving at the same time resetting solenoid 175 and permitting the gates to come under the control of the governor flyballs instead of the load limit rod 152. The speed can be adjusted to normal by means of the synchronizing motor 131 and the unit re-synchronized with the system. All of these operations can be performed from the switchboard without the necessity of an operator going to the unit for any manual operation.

*Complete shut-down.*—If it is desired to manually shut down the unit completely after the loss of voltage on the main generator, load limit handwheel 148 can be manually turned clockwise to raise plate 159 away from spindle 183 and close the turbine gates completely. To restart under these conditions, the operation is the same as previously described.

If it is desired to automatically shut down the unit completely following an interruption to the driving circuit instead of having it return to speed no load condition, lock nuts 196 should be tightened against the cover spindle 193 which makes plunger 181 and spindle 183 a rigid unit and this will prevent the spindle 183 and piston 195 from lowering and thus maintain plate 159 at its full upward position to hold pilot valve 24 in its uppermost position which insures that the turbine gates will remain shut.

*No load shut-down only.*—If, on the other hand, it is desired to have the turbine gates assume a no load position without first being closed and then re-opened lock nuts 196 should be tightened against cover 193 as described above, and lock nuts 194 should be adjusted to such a position that they will come in contact with and be stopped by the two lower surfaces on the guide bracket 160 when plunger 181 is at a position which will give speed no load. However, under these conditons the turbine speed will be reduced very slowly, due to the fact that considerable energy of rotation is contained in the generator rotor and runner and no decelerating effect except the windage and friction of the generator is reducing this speed. Whereas, with the other method the power required to drive the unit at no load is also cut off until the speed is returned to normal, thus causing the unit to reduce its speed much more rapidly than could be by limiting the stroke of plunger 181 without the use of the compensation features.

*Emergency control and throw-over.*—In governors of the general type employing centrifugal governing means or equivalent mechanism, means have heretofore been provided to disconnect the control of the gate operating cylinders from the governing mechanism and place the gate operating mechanism under the control of the emergency valve mechanism usually manually operated. To effect this change, a throw-over valve mechanism is usually employed, and in the present invention, I employ an improved arrangement between the throw-over valve and emergency valve mechanism whereby it may be made not only more cheaply, but is also more adapted to fit in and functionally co-operate efficiently with the various parts and arrangements of my improved governor.

The emergency control E, Figs. 1, 10 to 13, consists essentially, Fig. 12, of a hand wheel 200 operating a rotatable threaded spindle 201 so as to axially move, through a ball and socket connection, a piston valve 203 inside of a liner 204. Ports machined in this liner and passages and pipes leading therefrom are entitled opening 205, closing 206, pressure 207 and exhaust 208 and correspond to similar pipes leading from the main governor. The piping from the emergency valve ports and passages formed in the base is carried over outside of the base and interconnected with the piping running to the operating cylinders from the governor piping as shown in Figure 13.

To throw control of the gate operating mechanism from the governor over to the emergency or hand control a throw-over rotatable plug valve 209 is located in the lower portion 210 of the emergency valve housing and provided with an operating handle 211. When the unit is operating on governor control, the handle 211 is in vertical position as shown in Figs. 10 and 11. In this position the opening port and passage 206 are shut off by means of the valve 209. This plug is also in a position so that groove 212 exhausts the pressure, through a port and pipe connection 213, from the internal annular chamber 214a, Figs. 13 and 13a, of small valves 214 of the well known Johnson type such as shown in Johnson Patent 1,321,750. These valves are not here shown in detail as the piping and Johnson valve arrangement as shown is not a part of my invention and has been heretofore used. The Johnson valves however when supplied with pressure to an internal chamber 214b close the governor passages and pipes 32 and 33 to isolate the governor control and render it ineffective whereas when pressure is exhausted from the Johnson valves they open governor passages 32 and 33 to permit governor control of the gates.

By pulling handle 211 out to a horizontal position, plug cock 209 admits pressure through port 213 to the central chamber of the Johnson valves thus closing them and cutting off governor control of the gate operating cylinders. At the same time the plug cock through grooves 215 and 216 opens ports 205 and 206 to the operating cylinders whereby the emergency control valve 203 can be used to control the turbine gates.

Before throwing over the hand lever 211 to horizontal or emergency position, the handwheel 200 should be turned to move valve 203 to its neutral position. To close the turbine gates, hand wheel 200 should be turned clockwise to raise valve 203 which will admit pressure from port 207 to port 206 and exhaust from port 205 to 208, which would cause the turbine gates to close. To open the gates, the handwheel is turned counter clockwise to lower valve 203. The change over from the governor control to emergency control when the unit is operating on load is effected in essentially the same manner; that is, the valve 203, Figs. 11 and 12, is brought to neutral position before the handle is thrown over.

As seen in Fig. 1, the emergency control is located in the base B and secured thereto adjacent the door 39 by, Fig. 10, a flange 218 bolted to the base. This novel arrangement not only provides immediate access to the control, but also provides a visible means for indicating when the turbine is on emergency control in that the handle 211 projects out from the base B through the doorway and prevents the closing of the door so long as the unit is on emergency control. This insures the attention of the operator being drawn thereto and prevents any danger of not noticing that the unit is on emergency control, and when the turbine is on governor control, closure of the door prevents accidental or unauthorized manipulation or adjustment of the control. Depending upon the installation the emergency control may be disposed adjacent either of the doors on opposite sides of the base.

In changing over from emergency control to governor control, the load limit device 145 is set by means of hand wheel 148 until the groove 96, Fig. 4, lines up with the upper surface of the timing mechanism housing 88, thus bringing the pilot valve to neutral position and closing all the ports in the main valve. If, however, the flyballs are running and the load limit 145 is backed away from the operating position, then by adjusting the hand wheel 128, Figs. 3 and 5, the point 153, Fig. 3, through the restoring mechanism 155, can be raised or lowered as required to bring the groove 96 to the position as described above. This change over can be made at any speed or any gate opening of the unit providing the pilot valve is in neutral position. When this is done the handle 211, Figs. 1 and 11, can be thrown up to its governor control position and the door closed. When the unit is on governor control, the load can be adjusted either from the switchboard through handwheel 128 or handwheel 148 as desired.

The emergency valve 203 is also subject to restoring action upon movement of the turbine gates by an inter-connecting arm 220, Figs. 3 and 12, rigidly fastened to restoring rod 38 and threadedly connected as at 221 to the spindle 201. Thus, upon counter clockwise rotation of hand wheel 200, valve 203 moves downwardly to admit pressure from supply passage 207 to closing port and passages 205 so as to close the gates which will in turn cause rod 38 to move upwardly, thereby moving valve 203 back to its neutral position through the interconnected arm 220. The opposite movements take place when the valve 203 is moved upwardly for opening the gates.

*Indicating mechanism.*—As heretofore explained, in order to throw over from governor to emergency or hand control, it is desirable that emergency valve 203 be in neutral position. In order to indicate the gate and neutral positions, there is provided, Figs. 1 and 2, in a single instrument 225 means for indicating both of these factors. The co-operating arrangement of governor parts is such that the indicating mechanism, along with the tachometer 226 may be effectively mounted upon an instrument panel 227 supported on the side of the upper housing 40, and the parts within this housing and base have been brought into such cooperating relation that simple and yet highly efficient connections may be made for transmitting the motion of the emergency valve 203 and the turbine gates to the indication mechanism 225.

In the description of this mechanism, it is to be understood that the panel 227 may be mounted on either side of the upper housing 40 openings on each side being provided for this purpose, the unused opening having, Fig. 2, a suitable cover 228, which upon removal, also provides means of access to the upper housing. The instrument comprises, Figs. 18 to 21, a suitable flanged casing 230 having a pointer 231, for indicating neutral position of emergency valve 203, fixed to a shaft 232 mounted in a suitable bracket 233. The inner end of shaft 232 has a lateral arm 234 pivotally connected as by link 235 to an arm 236 which is journaled upon a shaft 237. The uper end of a yieldable connecting member 238 is pivotally connected to arm 236 as at 239, while the lower end of the yieldable connection is operatively connected to the emergency valve as at 240, Fig. 12, it being noted that the support 240 is swivelled on the upper end of threaded spindle 201 and prevented from rotating by guide pin and slot 241.

Neutral position is indicated when pointer 231 is in alignment with a small stationary pointer in the form of an inverted V 242, Fig. 1, disposed on a suitable plate mounted in the front of the instrument which is suitably covered with glass.

To indicate the gate positions, a pointer 243, Figs. 18 and 19, is fixed to a sleeve 243' which is also journaled in frame 233, the inner end of the sleeve being provided with a lateral arm 244 to which is directly connected a second yieldable connection 245. The lower end of connection 245 is pivotally connected, as at 246, to restoring arm 220, Fig. 12. Due to the fact that yieldable connections 238 and 245 are identical, and that their lower ends are directly connected to the points 240 and 246, disposed at different elevations it is necessary to use the extension linkages 235 and 236 to provide sufficient room for connection 238. The range of movement of the pointers is limited by arms 247, carried by both pointers, engaging a stop pin 248. A plate 249, graduated for various gate positions is provided behind the gate position pointer 243.

After either of the limit arms 247 have engaged stop pin 248, any further movement of restoring arm 220 or emergency valve 203 will be taken up by a double acting spring 250 interposed between two washers 251, all held within the larger of two bores 252 by a threaded plug 253. A rod 254 has nuts 255 for engaging the lower washer 251 and a spindle 256 for engaging the upper washer. Thus, if spindle 256 is held against movement, casing 257 may be moved in either direction against the action of spring 250 due to the washers 251 sliding on rod 254 so as to compress the spring in either direction of movement.

The indicating mechanism shown in Figs. 18 and 19 is suited for mounting upon the side of the upper housing 40 as shown in Fig. 1, although in order to mount the instruments on the opposite side, if such should be desired, there are provided certain alterations in the instruments such as shown in Figs. 20 and 21. The neutral position pointer 231 fixed to shaft 260 is actuated through a pair of gear segments 261, 262, segment 262 in turn being actuated by the connector 245' pivotally connected to an arm 263 secured to segment 262.

The gate position indicator 243 is fixed to a sleeve 264 in turn actuated by a gear 265 meshing with a gear segment 266. A shaft 267 carries the gear 265 and is actuated by an arm 268 pivotally connected to a connector 238'.

It is thus seen that when the emergency control E and instrument panel are on the same side, such as shown in Fig. 1, then one of the instruments, such as shown in Figs. 18 and 19 is used, whereas when emergency control E and instrument panel are disposed on the other side of the governor, the connectors are reversed, and in order that this reversal may be taken care of, the indicating mechanism such as shown in Figs. 20 and 21 is used.

A further feature in the lubrication system resides in the provision of a pressure reducer 75, Fig. 16, comprising a cylindrical casing 275 having a bore in which is disposed a series of identically flanged discs 276, the flanges having a small hole 277 therein and the holes in the successive discs being staggered so as to cause the lubricant to flow through a tortuous passage-way from the inlet 278 to the outlet 279 and thereby create sufficient friction to cause a pressure loss between the inlet and outlet. The final unflanged but drilled discs 280 are disposed in the opposite ends of the casing 275 and held therein by the inlet and outlet plugs 278 and 279 respectively. A series of suitable screens may be interposed between annular rings 281. This pressure reducer is disposed in the lubricant supply pipe 74, Fig. 4, so as to reduce the high pressure of the oil which is by-passed from the main source to the lubrication system.

To remove the upper housing and associated structure as a unit, it is only necessary to remove pin 101, Fig. 3, the bolts holding the upper housing to the base, pin 88, Fig. 4, and bolts 162, Fig. 7, whereupon there may be removed as a unit the upper housing 40, motor M, centrifugal head 43, the restoring mechanism and floating lever, and linkages 155 and 152, it being noted that prior to the removal of link 152, load limit housing 146 along with its cover 149, Fig. 7 will be removed leaving lever 152 rest upon guide bracket 160. After removal of the load limit device as described, the removal of the upper unit may be effected.

Figure 23:
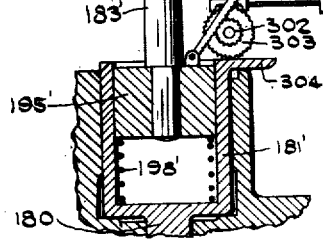
Fig. 23 is a modification showing mechanical means for reproducing the governor action.

*Reproduced governor action—mechanically controlled.*—As an alternative method of regulating the rate of return of the lever 152, Figs. 3 and 7, in order to reproduce the governor action when the synchronous driving relation between generator and governor is terminated, a mechanical timer may be used such as shown in Fig. 23. Inasmuch as this mechanism is substituted for the dash pot mechanism 195, etc., Fig. 7, the related mechanisms such as lever 152 have not been shown but it will be understood that such mechanisms are employed in connection with this mechanical timer. When oil pressure is admitted under piston 180 due to the main generator current failing and permitting valve 176 to drop, Fig. 7, plunger 181' is raised during which time compression spring 198' simultaneously raises a guide head 195', thereby moving stem 183' upwardly to engage lift block 159 and accordingly lever 152. This results in moving the turbine gates toward their closing position, but in order to permit re-opening of the gates to preferably speed no-load position a suitable mechanical escapement mechanism is provided to permit spindle 183' and guide head 195' to move downwardly against the spring 198' which normally does not offer sufficient pressure to be able to hold spindle 183' up against the weight of the various elements associated with the link 152 including the weight 76 spring 154 or other elements. The escapement mechanism comprises a rack 300 pivotally supported at one end by guide head 195' while the other end is held outwardly by a compression spring 301 in order to maintain engagement of the rack with gear 302 mounted upon a shaft which also rigidly carries an escapement wheel 303. Gear 302 and wheel 303 are suitably rotatably supported on a bracket 304 carried on plunger 181' as is also pivotal escapement member 305. Extending outwardly from the escapement member is a threaded rod 306 carrying adjustable weights 307.

In operation assume that plunger 181' and spindle 183' have just been raised to their maximum height, the pressure bearing down upon spindle 183' due to the weight of lever 152 and the other elements causing guide head 195' to tend to move downwardly relative to plunger 181' which remains stationary thereby causing rack 300 to move downwardly and rotate gear 302 and likewise escapement wheel 303. The degree with which rotation of this escapement wheel is retarded determines the rate at which spindle 183' drops and this in turn determines the rate at which the turbine gates are reopened. To increase the degree of retardation weights 307 are moved outwardly on rod 306 and inwardly to decrease the degree of retardation. The escapement mechanism diagrammatically shown is well understood and consists simply in making the weights 307 and member 305 oscillate as does any escapement mechanism.

After the guide head 195' has reached its lowermost position for reopening the gates and with plunger 183' still in its uppermost position due to oil pressure beneath piston 180 the next step is upon release of the pressure beneath piston 180, the plunger 181' will move downwardly carrying with it the gear and escapement wheel 302, 303, while the guide head 195' remains stationary. To permit this relative movement to be free from any retardation due to the escapement mechanism the teeth on rack 300 and gear 302 are of the sawtooth type disposed to permit this free movement of rack 300 over the gear 302 but catching in the reverse direction.

For a complete understanding of the operation of the various phases of my invention, reference should be had to the descriptions under the various captions relating to these phases. However, the operation can be generally described in that, assuming the operator has set hand wheel 148, Figs. 3, 7 for some load limit and emergency lever 211 is in its vertical position for effecting automatic speed control by the governor (at right angles to position shown in Fig. 1) the centrifugal head 43a upon being rotated by synchronous motor M in proportion to the turbine or generator speed, causes pilot valve 24 to move up or down from a neutral point depending upon the direction in which the speed varies from a predetermined value. As the pilot valve moves, the main distributing sleeve valve moves accordingly to allow fluid to be admitted to either the closing or opening cylinders, Fig. 13, whereupon, the restoring mechanism including rod 38, Fig. 3, acts upon the pilot valve as by engagement through elements 153 and 84. These operations are usual in hydraulic governors. During these operations if the generator voltage fails the protective device 147, Fig. 3, operates to control the pilot valve through elements 152, 153 and 84 in the manner previously described. Briefly the operation is that failure of generator voltage deenergizes solenoid 175 thereby allowing needle valve 176 to drop and admit fluid pressure to the under side of piston 180 whereupon rod 183 is raised to engage and lift the left end, Fig. 7, of rod 152 which as shown in Fig. 3 will thereby cause members 153 to engage and raise collar 84. The pilot valve 24 will accordingly be moved upwardly so as to control the distributing valve 22 in such a manner that the usual gate operating servo motor of the hydraulic turbine will move in a closing direction. As seen from a specific description of the elements 145 and 147, Figs. 7, 8 and 9, the dash pot mechanism 181 upon being initially raised by fluid pressure beneath plunger 180 will function to first move the turbine gates either to closing position or toward the same, after which the dash pot piston 195, rod 183 and accordingly the right end of pilot valve control lever 152 will move down against spring 198 and thereby re-open the turbine gates, whereby the turbine speed will be moved relatively quickly to its synchronous speed or speed no-load position This action reproduces, in effect the governor action even though the governor is not operating through its centrifugal flyball head. The extent of downward movement of piston 195 is limited by the adjustment of cam 151 with which the pin 158 will finally engage, thus holding arm 152 and accordingly collar 84 and pilot valve 24 at a predetermined position, Fig. 3. If it is desired to adjust the load on the unit the motor 131 may be operated to adjust the left hand of lever 58 which will act upon the pilot valve 24 through the double spring and weight arrangement 76. If it is also desired to place the turbine under manual control the throwover handle 211, Figs. 1 and 11 is moved to the horizontal position shown in Fig. 1 whereupon by the manipulation of the hand wheel 200, manually controlled distributing valve 203 will supersede the pilot valve controlled distributing valve. Manipulation of throwover handle 211 also effects closure of the Johnson valves 214 so that it is impossible for the governor to impress any of its functions upon the gate operation.

Thus I have shown both hydraulic and mechanical means for accomplishing this reproduced governor action upon failure of the synchronous driving relation between the governor head and the turbine or prime mover and each is equally effective in first closing the turbine gates and then reopening same.

I claim:

1. In a governor for controlling a prime mover having power control mechanism, a speed responsive device having provision for being driven in synchronism with said prime mover, means adapted to be responsive to said synchronized relation and means controlled thereby adapted automatically upon failure of said synchronized driving relation to effect closure of said control mechanism below speed no load position and thereafter to open the same to speed no load position.

2. In a governor for controlling a prime mover having power control mechanism, a speed responsive device having provision for being driven in synchronism with said prime mover, means adapted to be responsive to said synchronized relation and means controlled thereby adapted automatically upon failure of said driving relation to effect closure substantially entirely of said control mechanism and thereafter to reopen the same.

3. In a governor, the combination comprising a prime mover having power control mechanism, a speed responsive device driven in synchronism with said prime mover, means adapted automatically upon failure of said synchronized driving relation to close said control mechanism below speed no load position and thereafter to open the same to speed no load position, and means for adjusting the extent of automatic closure of said control mechanism.

4. In a governor, the combination comprising a prime mover having power control mechanism, a speed responsive device driven in synchronism with said prime mover, means adapted automatically upon failure of said driving relation to move said control mechanism to a predetermined closing position and thereafter to reopen the same to a predetermined position, and means for adjusting the extent of reopening.

5. In a governor, the combination comprising a prime mover having power control mechanism, a speed responsive device driven in synchronism with said prime mover, means adapted automatically upon failure of said driving relation to move said control mechanism towards closing position and thereafter to reopen the same to a predetermined position, and means for effecting a delay between said failure and the moving of said control mechanism.

6. In a governor, the combination comprising a prime mover having a power control mechanism, a speed responsive device driven in synchronism with said prime mover, means adapted automatically upon failure of said synchronized driving relation to move said control mechanism towards closing position and thereafter to reopen the same to a predetermined position, and means for automatically resetting said other means upon restoration of said synchronized driving relation.

7. In a governor, the combination comprising a prime mover having power control mechanism, a speed responsive device driven in synchronism with said prime mover, means adapted automatically upon failure of said driving relation to effect movement of said control mechanism towards closing position and thereafter to effect movement in an opening direction, and means for causing a delay between said failure and the effecting of movement of said control mechanism and to adjust the extent of delay.

8. In a governor, the combination comprising a prime mover having power control mechanism, a speed responsive device driven in synchronism with said prime mover, means adapted automatically upon failure of said driving relation to move said control mechanism to a predetermined closing position and thereafter to reopen the same to a predetermined position, and means adapted to effect different rates of opening and closing movements.

9. In a governor, the combination comprising a prime mover having power control mechanism, a speed responsive device driven in synchronism with said prime mover, means adapted automatically upon failure of said driving relation to move said control mechanism to a predetermined closing position and thereafter to reopen the same to a predetermined position, said automatic means including a dash-pot adapted to be moved by fluid pressure and having provision for fluid control of the reopening operation.

10. A governor adapted to control a prime mover operated alternating current generator having a usual power control mechanism comprising, in combination, an alternating current motor adapted to be actuated by current from said generator, a speed responsive device driven by said motor whereby it would normally be maintained in synchronism with said prime mover, means adapted automatically upon failure of said synchronous driving relation to effect movement of said control mechanism to a predetermined closing position and thereafter to reopen the same to a predetermined position, said automatic means having a solenoid controlled dash-pot, the solenoid being adapted to be energized by current from said generator.

11. A governor adapted to control a prime mover operated alternating current generator having a usual power control mechanism comprising, in combination, an alternating current motor adapted to be actuated by current from said generator, a speed responsive device driven by said motor whereby it would normally be maintained in synchronism with said prime mover, means adapted automatically upon failure of said synchronous driving relation to effect movement of said control mechanism to a predetermined closing position and thereafter to reopen same to a predetermined position, said automatic means having a solenoid controlled dash-pot mechanism including a hollow movable plunger adapted to be actuated by fluid pressure for effecting closing of said control mechanism, and a piston disposed within said hollow plunger and adapted to be moved by said plunger and to have fluid controlled movement relative thereto for controlling the reopening of said control mechanism.

12. A governor, adapted to control a prime mover having gate mechanism and an electrical generator driven thereby, comprising, in combination, a speed responsive device having provision for being driven in synchronism with said prime mover for controlling said gate mechanism, and a shut down device adapted to control said gate mechanism automatically upon a predetermined drop in generator voltage, said shut down device including a solenoid controlled pilot valve, and means for exerting an increasing force during and against movement of the solenoid core when energized upon restoration of the generator voltage.

13. A goveror, adapted to control a prime mover, having gate mechanism and an electrical generator driven thereby, comprising, in combination, a speed responsive device having provision for being driven in synchronism with said prime mover for controlling said gate mechanism, and a shut down device adapted to effect control of said gate mechanism, automatically upon a predetermined drop in generator voltage, said shut down device including a solenoid controlled pilot valve, and a spring resisting movement of the solenoid core when energized whereby a relatively small voltage drop from normal permits closing movement of the shutdown device and a relatively small voltage permits opening movement of the shut down device.

14. In a governor, the combination comprising a speed responsive device, a control valve, means for operatively connecting said device and valve, including a floating lever and an associated mechanism, and means for adjusting the normal space relation between said mechanism and lever comprising a rotatable screw having threaded engagement with a non-rotatable nut carried by said lever, a fixed support, a motor secured thereon, and a slidable connection between said motor and screw.

15. In a governor, the combination comprising a speed responsive device, a control valve, means for operatively connecting said device and valve, including a floating lever and associated mechanism, means for adjusting the normal space relation between said mechanism and lever comprising a rotatable screw sleeve having threaded engagement with a non-rotatable nut carried by said lever, and means for operating said sleeve both manually and by power, including a hand wheel and gear each secured to said sleeve for rotation thereof, and a driving gear meshing with and having axial slidable engagement with said other gear.

16. In a governor, the combination comprising a speed responsive device, a control valve, means for operatively connecting said device and valve, including a floating lever and associated mechanism, and means for adjusting the normal space relation between said mechanism and lever comprising a screw and nut one of which is carried by said lever and the other of which is adapted for actuation, and a unitary structure for effecting said actuation including a base, an electric motor mounted on the lower side thereof, and gearing associated with said motor and base and extending above said base.

17. In a governor, the combination comprising a speed responsive device, a control valve, means for operatively connecting said device and valve including a floating lever and a double acting spring controlled member disposed between said lever and valve whereby said lever may move in either one of opposite directions against the action of said spring control, said spring control being adapted for adjustment without affecting the position thereof with respect to said lever.

18. In a governor, the combination comprising a speed responsive device, a control valve, and means for operatively connecting said device and valve, including a lever and means having a single double acting spring operatively connecting said lever and valve, and being pivotally supported by said lever whereby said lever may move in either one of opposite directions against the action of said spring.

19. In a governor, the combination comprising a speed responsive device, a control valve, and means for operatively connecting said device and valve including a pivoted weight having a bore in which double acting yieldable means is disposed.

20. In a governor, the combination comprising a speed responsive device, a control valve, means for operatively connecting said device and valve including a weight having a bore in which a double acting spring is disposed, means supporting said spring including a plurality of sets of relatively movable cooperating members, and a single adjustable element for bringing all of said relatively movable members into simultaneous contact with their respective cooperating member.

21. In a governor, the combination comprising a speed responsive device, a control valve, and means for actuating said valve comprising a lever, and a cam movable on an axis angularly disposed to the axis of said lever for effecting adjustment thereof.

22. In a governor, the combination comprising a speed responsive device, a control valve, means for actuating said valve, including a lever and a helical cam for adjusting the same, and means whereby said cam may be removed from its operative position while said lever remains substantially in its operative position.

23. In a governor, the combination comprising a speed responsive device, a control valve, and means for actuating said valve, including a lever, a housing for receiving one end thereof, and means for moving said end, including an automatic shut-down device in the lower portion of said housing and a load limit device in the upper portion of said housing.

24. In a governor, the combination comprising a speed responsive device, a control valve, means for actuating said valve, including a rod and a housing for receiving an end of said lever and automatic shut-down and load limit mechanisms for actuating said end of the lever.

25. In a governor, the combination comprising, in a load limit device, a cam, manually operable means rotatable on one axis for effecting operation of said cam, and motor actuated means for said cam disposed on an axis angular to said manual operating axis.

26. In a governor, the combination comprising, in a load limit device, a housing, a cam therein, manual operating means for said cam disposed on the top of said housing, and motor actuating and position transmitter mechanisms disposed on the side of said housing and substantially in alignment with each other.

27. In a governor, the combination comprising a speed responsive device, a control valve, a restoring mechanism, a load limit device and linkages extending from said restoring mechanism across to said load limit device, and a connection between said speed responsive device and valve extending past said linkages for operative connection therewith and being interposed between said load limit device and restoring mechanism.

28. In a governor, the combination comprising a speed responsive device, a restoring rod, a load limit device, a control valve, means including a double acting spring connecting said speed responsive device and control valve and interposed between said load limit device and restoring rod, and a plurality of relatively yieldable linkages adapted to operatively connect said restoring rod, control valve, connecting means and load limit device.

29. In a governor, the combination comprising a base of relatively large vertical extent and in plan view being substantially fan shaped, a speed responsive device supported by said base, a fluid distributing valve and passage disposed in the large end of said base, means for controlling said distributing valve by said speed responsive device, and other mechanism including a driving motor associated with said speed responsive device, disposed in the smaller end of said base.

30. In a governor, the combination comprising a base of relatively large vertical extent and in plan view being substantially fan shaped, a speed responsive device supported by said base, a fluid distributing valve and passages disposed in the large end of said base, means for controlling said distributing valve by said speed responsive device and other mechanism disposed in the smaller end of said base, including a synchronous motor for driving said device.

31. In a governor, the combination comprising a base, a fluid distributing valve and passage arrangement disposed in one end of said base, and actuating means for said valve, including a support carrying as a unit therewith a centrifugal head above the support and an electric motor for actuating said head disposed on the under side of said support.

32. In a governor, the combination comprising a base, a fluid distributing valve and passage arrangement disposed in one end of said base, and actuating means for said valve including an upper housing carrying as a unit therewith a centrifugal head above the housing and an electric motor for actuating said head disposed on the underside of said upper housing, said motor being disposed within said base but being removable therefrom in an upward direction while retaining its unitary relation to said upper housing.

33. In a governor, the combination comprising a base of relatively large vertical and horizontal extent having a fluid distributing valve and passage arrangement in one end thereof, and actuating means for said valve, including a relatively small upper housing enclosing restoring and synchronizing mechanisms formed as a unitary structure with said housing which is disposed at the other end of the base.

34. In a governor, the combination comprising a base having a fluid distributing valve and passage arrangement therein, and an upper housing carrying a plurality of actuating means for said valve, a load limit device and restoring mechanism for said valve including a link associated with said load limit device and extending through a side of said upper housing.

35. In a governor, the combination comprising a base having a fluid distributing valve and passage arrangement therein, governor operating mechanism therefor, an emergency control valve, and a throw-over valve adapted to render said governor or emergency valves alternatively operable, including an operating throw-over handle adapted when the throw-over valve is in one position to extend outwardly through an opening in said base to provide a visible indicator, and when said throw-over valve is in another position said handle is within said base.

36. In a governor, the combination comprising a base having a door, a fluid distributing valve and passage arrangement disposed in said base, a governor control for said valve, an emergency control valve adapted to be operated manually, and a throw-over valve mechanism adapted to render said emergency control ready for operation, said throw-over valve having a handle which when in one position of control projects through the doorway to prevent closure of the door, and when in its other control position is free of the doorway to permit closure thereof.

S. LOGAN KERR.

CERTIFICATE OF CORRECTION.

Patent No. 1,901,831.                                                                         March 14, 1933.

SAMUEL LOGAN KERR.

It is hereby certified that error appears in the printed specification of the above numbered patent requiring correction as follows: Page 16, line 69, claim 24, for "rod" read lever; and that the said Letters Patent should be read with this correction therein that the same may conform to the record of the case in the Patent Office.

Signed and sealed this 6th day of March, A. D. 1934.

F. M. Hopkins (Seal)                                       Acting Commissioner of Patents.